May 10, 1955  J. STOLLMAN  2,707,992
STORM SCREEN WINDOW
Filed July 30, 1952  2 Sheets-Sheet 1
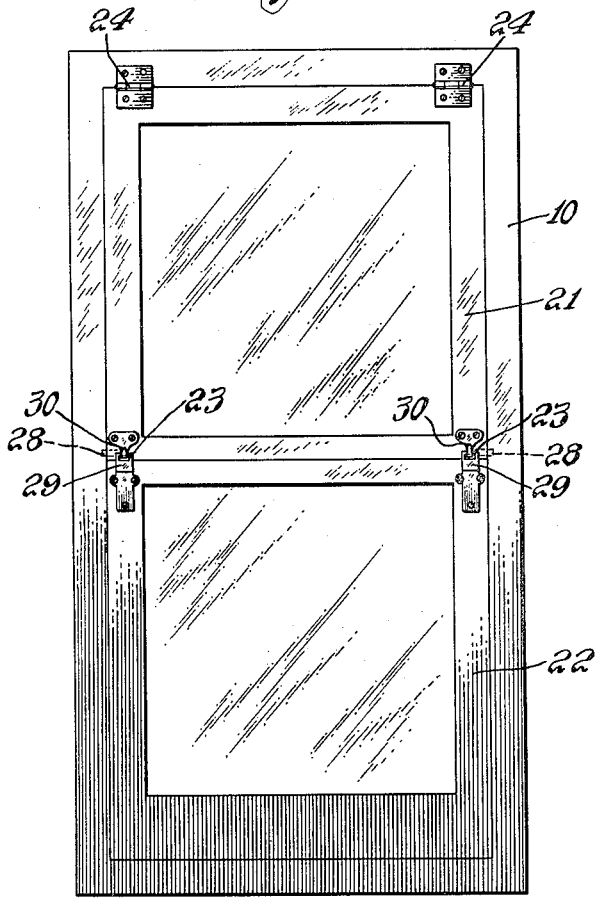
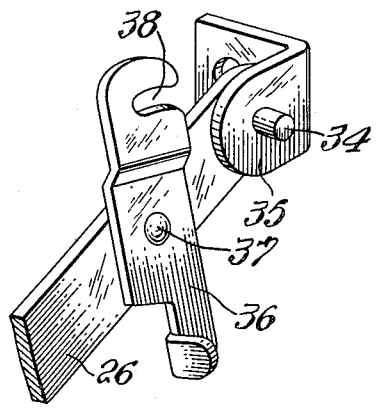
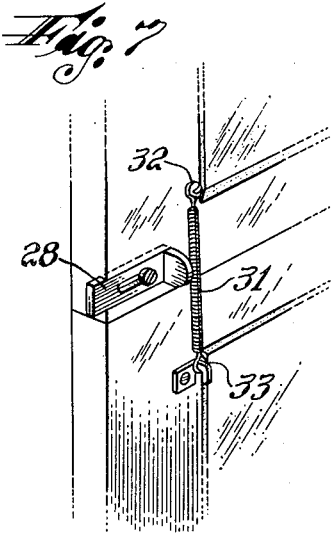
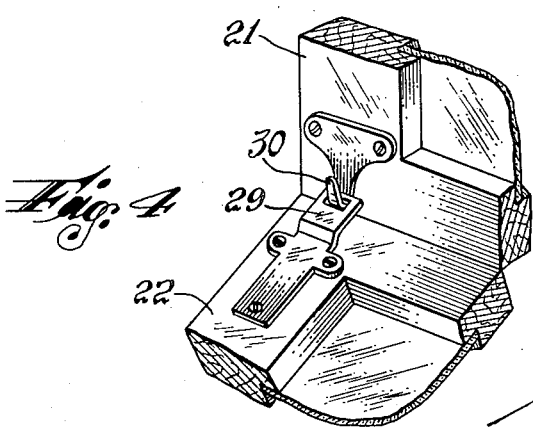
INVENTOR.
J. Stollman
BY
ATTORNEY May 10, 1955  J. STOLLMAN  2,707,992
STORM SCREEN WINDOW
Filed July 30, 1952  2 Sheets-Sheet 2
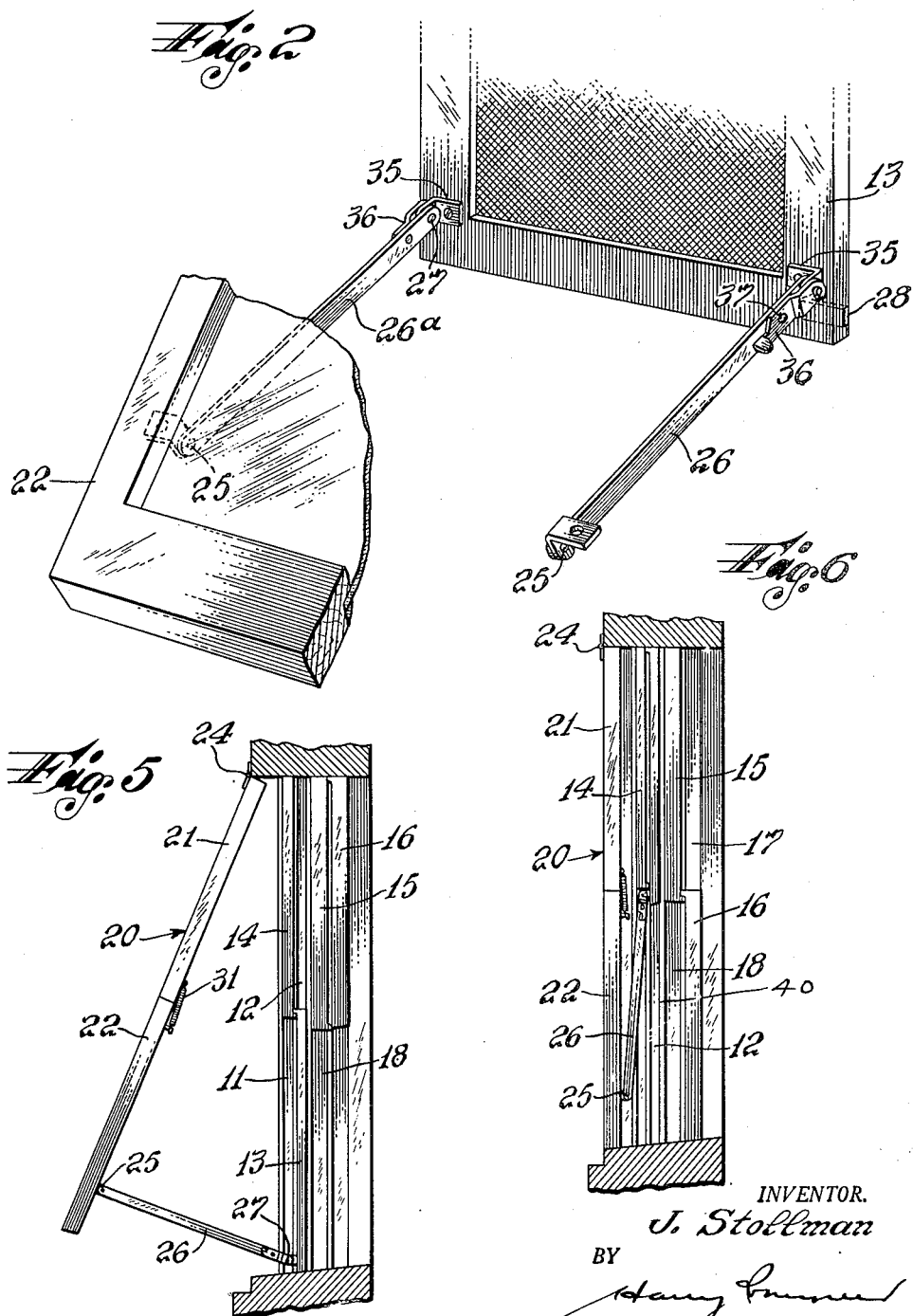
INVENTOR.
J. Stollman
BY
Harry [signature]
ATTORNEY

United States Patent Office 2,707,992
Patented May 10, 1955

2,707,992

STORM SCREEN WINDOW

Jacob Stollman, Lake Parsippany, N. J.

Application July 30, 1952, Serial No. 301,673

6 Claims. (Cl. 160—95)

This invention relates to window constructions and, more particularly, is directed to the provision of a storm screen window comprising a casing having a pair of wire screen frames vertically slidably movable therein to provide for ventilation during the summer months, and a pair of glass window frames with link means connecting the latter to the wire frame members. The arrangement, as will become apparent from a consideration of the drawings and the description below, includes the provision of link means connecting the storm and wire screen frames so that when one of the wire screen frames is in its lowermost position, for ventilation during the summer months, the storm frames will be moved away from the casing, and, when the storm frame is moved within the casing, to provide the storm protection during the cold winter months, the screen frame will be moved to its upper position.

These and other advantageous objects, which will appear from the drawings and from the description hereinafter, are accomplished by the structure of my invention, of which embodiments are illustrated in the drawings. It will be apparent from a consideration of said drawings and the following description, that the invention may be embodied in other forms suggested thereby, and such other forms as come within the scope of the appended claims are to be considered within the scope and purview of the instant invention.

In the drawings:

Fig. 1 is a front elevational view of a storm screen window embodying the invention, Fig. 2 is a fragmentary perspective view thereof, with the storm frame shown moved away from the screen frame, by the position of the latter and the action of the links connecting the same, Fig. 3 is an enlarged perspective view of a means for removably connecting the links of the storm screen to the wire screen frame, Fig. 4 is an enlarged perspective view of the glass frames forming the storm unit at their points of pivotal connection together, Fig. 5 is a partly sectional, vertical, elevational view of the storm screen window of the invention, with the storm screen shown moved to its outer position, and the wire screen to its lower position, Fig. 6 is a similar view, showing the storm screen window in its closed position, and Fig. 7 is an enlarged fragmentary view of the inner portion of the glass frames, taken interiorly of the device, to show more clearly the action of the latch members which engage the casing to hold the storm frames thereto.

As shown in the drawings, the device of the invention comprises a storm screen window casing 10 having spaced vertical channels 11, 12 therein. A pair of wire screen frames 13, 14 are vertically slidably disposed in the channels, the frame 14 during the summer months being disposed at the lowermost position of this channel, as shown in Fig. 5, to correspond with the opening in the casing occasioned by the disposition of the conventional inner glass frames 15, 16, at the upper ends of the channels 17, 18 in the casing 10. The storm glass unit 20 consists of first and second storm glass frames 21, 22, preferably pivotally and removably connected together, provided to close the casing 10 against the elements, as shown in Fig. 6, when the storm glass unit 20 is positioned in closing relation to the outside of the casing 10. That arrangement would, of course, be used in winter months and on other occasions where it is desired to seal the room in which the casing 10 is positioned against the elements. The storm glass unit 20 is pivotally connected at its other end, as indicated at 24 in Fig. 5, to the casing 10, the lower end of the unit 20 having pivotally connected thereto, as at 25, a link 26 which is pivotally and removably connected at its other end 27 to the wire screen frame 13. As the point of pivotal connection 27 of the link 26 to the screen 13 is located at the lower end of the screen 13 and the opposite end of the link is pivoted at 25, adjacent the lower end of the second storm glass frame 22, it will be apparent that with the inner glass frames 15, 16 disposed upwardly in the casing (and the screen frame 14 being likewise disposed upwardly in the casing), the screen frame 13 may then be slid to its lowermost position in the casing, which will cause the storm glass unit to be moved outwardly, as shown in Fig. 5, by virtue of the link connection 26 above described. This arrangement will permit the casing to have its full opening and the storm glass unit 20 to be separated from the lower end of the casing so as to permit the free flow of air through the latter. To close the casing, it is merely necessary to raise the wire screen 13 to the position shown in Fig. 6, which will cause the storm glass unit 20, by virtue of the link connection 26, to be drawn tightly against the casing 10, sealing the same, as shown in Fig. 6.

It will be apparent from the foregoing description that, essentially, the single wire frame 13 would suffice. However, if it is desired to open only the upper end of the casing to the outside elements, then the inner glass frames 15, 16 would be moved to their lowermost position in the casing, (also the screen frame 13) while the second wire screen frame 14 will be moved to its uppermost position in the casing, permitting the flow of air through the upper end of the casing. One of the storm glass frames, as, for example, 21, may be provided with the latch members 28 which are adapted to have slidable engagement with recesses in the casing to latch the storm glass unit to the casing. It will be apparent that the latch members 28 would be withdrawn from the recesses when it is desired to move the storm glass unit 20 to its outer position shown in Fig. 5. It may be desirable at times, to remove the storm glass frame 22; for that purpose, the pivotal connection 23 may preferably be one which additionally provides a removable connection between the storm glass frames 21, 22, as shown in Fig. 4, wherein one of the frames is provided with an open socket 29 to receive the nosing 30 of the other frame to thereby removably and pivotally connect the said frames together. For the purpose of normally holding the frames 21, 22 in axial alignment, as shown in Figs. 5 and 6, a spring member 31 is preferably fixed at one end 32 to one of said frames and removably connected at its other end 33 to the other frame, as shown in Fig. 7. It may likewise be desirable to movably connect the end 27 of the link 26 to the wire screen frame 13, and this objective may be attained, for example, as shown in Fig. 3, by providing the link end with a pin 34 adapted to be removably inserted in a socket 35 fixed to the wire screen frame 13; to preclude accidental displacement of said parts, a latch member, as indicated at 36 in Fig. 3, may be provided, pivotally connected to the link as at 37 and having a nosing 38 to engage pin 34 at the opposite side of the socket 35, as shown in Fig. 3. The link means 26 above described may be a single link or a pair of links 26, 26a.

One of the vertical rib-like channel-dividers 40 which extends inwardly of the casing 10 sufficiently to confine the glass frame 15 therein, may be made removable so as to facilitate removal of the glass frame 15, for example, for the purpose of cleaning the same and for other purposes. Thus, the frame 15 may be moved downwardly to its lower position and then, on removal of the vertical divider 40, the frame 15 may be swung outwardly of the casing 10 for the purpose mentioned. The invention may also be used, for example, for porch window purposes without including the inner glass frames 15, 16 in the casing 10.

Where the invention is used for porch window purposes, the casing 10 may be part of the framework for storm windows for the porch and may be so proportioned as to extend to the very floor of the porch. Likewise, the first storm glass section 21 may be shortened for either window or porch purposes or may be fixed to the casing according to the requirements of the specific application to which the invention is put.

Having thus described my invention, what I claim as new and desire to secure by Letters Patent is:

1. A storm screen window construction comprising a casing having opposite side portions provided with vertically extending tracks, a screen frame slidable vertically in said tracks to raised and lowered positions, a storm glass frame for closing the casing outwardly of said screen frame hinged at its upper end to the top portion of the casing and closing said casing when disposed vertically in a closed position, and elongated stiff links extending between the storm glass frame and the screen frame, said links having their outer ends pivotally connected to the storm glass frame adjacent the opposite side edges of the lower portion thereof, the inner ends of said links being pivotally connected to the screen frame adjacent the opposite side edges of the lower end portion thereof said links being disposed vertically when the storm glass frame is closed and the screen frame is in its raised position said links constituting pushers serving to swing the storm glass frame outwardly and upwardly and support it in an opened position when the screen frame is moved downwardly to its lowered position.

2. The structure of claim 1, wherein the inner ends of the links are connected with the screen frame by brackets secured to the outer surface of the screen frame and having portions projecting from the screen frame and formed with openings through which rotatably pass pins carried by and projecting laterally from the side faces of the links, and latches carried by said links and movable relative thereto into and out of position for engaging the pins and holding the pins against movement out of the openings.

3. The structure of claim 1, wherein the links are connected with the screen frame by brackets secured to the screen frame and having ears projecting from the screen frame and formed with circular openings through which rotatably pass pivot pins extending laterally from the links with portions of the pins protruding from the ears, and latches pivoted to said links and each having one end formed with a slot for receiving the protruding portion of the companion pin carried by said link and its other end formed with a finger-engaging portion upon which pressure is applied to turn the latch to adjusted positions.

4. The structure of claim 1, wherein the storm glass frame consists of upper and lower sections having meeting ends pivotally and detachably connected with each other, and spring means bridging the inner surfaces of the connected ends of the upper and lower sections and urging the lower section towards a position in which connected ends of the said upper and lower sections have abutting aligned engagement with each other.

5. The structure of claim 1, wherein the storm glass frame consists of upper and lower sections having meeting ends normally disposed in abutting and aligned engagement with each other, and members pivotally and detachably connecting the said ends of the upper and lower sections with each other.

6. The structure of claim 1, wherein the storm glass frame consists of upper and lower sections having meeting ends normally disposed in abutting and aligned engagement with each other, and hinge members pivotally and detachably connecting said sections and each consisting of a socket member formed with an opening and a hook member having a bill removably passing through the opening.

References Cited in the file of this patent

UNITED STATES PATENTS

| | | |
|---|---|---|
| 442,150 | Swartz | Dec. 9, 1890 |
| 935,577 | Beatty | Sept. 28, 1909 |
| 2,372,792 | Oswald | Apr. 3, 1945 |